(12) United States Patent
Nissim Kobliner et al.

(10) Patent No.: US 10,984,130 B2
(45) Date of Patent: Apr. 20, 2021

(54) EFFICIENTLY QUERYING DATABASES WHILE PROVIDING DIFFERENTIAL PRIVACY

(71) Applicants: Georgetown University, Washington, DC (US); Trustees of Boston University, Boston, MA (US); Bornio, Inc., Menlo Park, CA (US)

(72) Inventors: Yaacov Nissim Kobliner, Kensington, MD (US); Georgios Kellaris, Montreal (CA); George Kollios, Cambridge, MA (US)

(73) Assignees: Georgetown University, Washington, DC (US); Trustees of Boston University, Boston, MA (US); Bornio, Inc., Menlo Park, CA (US)

( * ) Notice: Subject to any disclaimer, the term of this patent is extended or adjusted under 35 U.S.C. 154(b) by 283 days.

(21) Appl. No.: 16/197,813

(22) Filed: Nov. 21, 2018

(65) Prior Publication Data

US 2019/0156057 A1     May 23, 2019

Related U.S. Application Data

(60) Provisional application No. 62/589,468, filed on Nov. 21, 2017.

(51) Int. Cl.
   *G06F 21/00*      (2013.01)
   *G06F 21/62*      (2013.01)
   (Continued)

(52) U.S. Cl.
   CPC .... *G06F 21/6245* (2013.01); *G06F 16/24532* (2019.01); *G06F 16/24558* (2019.01); *G06F 16/9535* (2019.01)

(58) Field of Classification Search
   CPC .......... G06F 21/6245; G06F 16/24558; G06F 16/9535; G06F 16/24532
   See application file for complete search history.

(56) References Cited

U.S. PATENT DOCUMENTS

2014/0344944 A1* 11/2014 Olumofin ............ G06F 21/6245
                                                          726/26
2015/0039903 A1   2/2015 Cash et al.
(Continued)

OTHER PUBLICATIONS

Arasu et al., "Orthogonal Security with Cipherbase," *In 6th Biennial Conference on Innovative Data Systems Research (CIDR '13)*, 10 pages, Jan. 6-9, 2013.

(Continued)

*Primary Examiner* — Shin-Hon (Eric) Chen
(74) *Attorney, Agent, or Firm* — Klarquist Sparkman, LLP (57) ABSTRACT

Technologies are provided for efficiently querying a database using a plurality of oblivious random-access memories (ORAMs) while providing differential privacy. Subsets of a set of database records can be stored in a plurality of ORAMs. The subsets of database records in the separate ORAMs can be concurrently accessed (for example, by a database query server). When a database query is received, a number of database records that match the query can be identified for each of the ORAMs. A differential privacy constraint can be used to determine an additional number of database records to be retrieved from each ORAM. The differential privacy constraint can specify an upper bound on the number of records to be retrieved from each ORAM to prevent (or reduce the risk of) information leakage. Once all of the identified records are retrieved from the plurality of ORAMs, the additional records can be discarded.

17 Claims, 6 Drawing Sheets

(51) Int. Cl.
  *G06F 16/9535* (2019.01)
  *G06F 16/2455* (2019.01)
  *G06F 16/2453* (2019.01)

(56) References Cited

U.S. PATENT DOCUMENTS

| | | | |
|---|---|---|---|
| 2015/0286827 A1* | 10/2015 | Fawaz | H04L 9/00 |
| | | | 726/26 |
| 2016/0098355 A1 | 4/2016 | Gorobets | |
| 2016/0275308 A1* | 9/2016 | Hubaux | H04L 9/065 |
| 2017/0185534 A1* | 6/2017 | Wagh | G06F 12/1408 |
| 2017/0212679 A1 | 7/2017 | Pass et al. | |
| 2017/0372226 A1* | 12/2017 | Costa | G06F 21/60 |
| 2018/0096166 A1* | 4/2018 | Rogers | H04W 12/02 |

OTHER PUBLICATIONS

Arasu et al., "Querying Encrypted Data (Tutorial)," *In 6th Biennial Conference on Innovative Data Systems Research* (CIDR '13), 2 pages, Jan. 6-9, 2013.

Bajaj et al., "TrustedDB: A Trusted Hardware-Based Database with Privacy and Data Confidentiality," *IEEE Transactions on Knowledge and Data Engineering*, vol. 26, No. 3, pp. 752-765 (Mar. 2014).

Boyle et al., "Oblivious Parallel Ram and Applications," *In Theory of Cryptography Conference*, Springer, 37 pages (2016).

Cash et al., "Leakage-Abuse Attacks Against Searchable Encryption," *In CCS*, 35 pages (2015).

Chang et al., "Oblivious RAM: A Dissection and Experimental Evaluation," *In Proceedings of the VLDB Endowment*, vol. 9, No. 12, pp. 1113-1124 (2016).

Dwork et al., "Our Data, Ourselves: Privacy Via Distributed Noise Generation," *In EUROCRYPT*, 18 pp. (2006).

Dwork et al., "Calibrating Noise to Sensitivity in Private Data Analysis," *In TCC*, 20 pages (2006).

Gentry, "Computing Arbitrary Functions of Encrypted Data," *CACM* 53, 3, pp. 97-105 (2010).

Goldreich et al., "Software Protection and Simulation on Oblivious RAMs," *Journal of the ACM 43*, 3, pp. 431-473 (Jan. 1996).

Hardt et al., "A Multiplicative Weights Mechanism for Privacy-Preserving Data Analysis," *In Foundations of Computer Science* (*FOCS*), 2010 IEEE 51st *Annual Symposium on* Foundations of Computer Science, pp. 61-70 (2010).

Hore et al., "Secure Multidemensional Range Queries Over Outsourced Data," *VLDBJ* 21, 3, pp. 333-358 (2012).

Islam et al., "Inference Attack Against Encrypted Range Queries on Outsourced Databases," *In CODASPY '14*, pp. 235-246, Mar. 3-5, 2014.

Kellaris et al., "Generic Attacks on Secure Outsourced Databases," *In CCS '16*, 12 pages, Oct. 24-28, 2016.

Kellaris et al., "Accessing Data While Preserving Privacy," arXiv preprint arXiv:1706.01552, 14 pages (Jun. 5, 2017).

Naveed et al., "Inference Attacks on Property-Preserving Encrypted databses," *In CCS '15*, 13 pages (Oct. 12-16, 2015).

Popa et al., "CryptDB: Protecting Confidentiality with Encrypted Query Processing," *In SOSP '11*, 16 pages (Oct. 23-26, 2011).

Sahin et al., "Taostore: Overcoming Asymchronicity in Oblivious Data Storage," *In SP*, 20 pages (2016).

Shi et al., "Oblivious RAM with $O((\log N)^3)$ Worst-Case Cost," *In ASIACRYPT*, 18 pages (2011).

Stefanov et al., "Towards Practical Oblivious RAM," *In NDSS*, 40 pages (Dec. 18, 2012).

Stefanov et al., "Path ORAM: An Extremely Simple Oblivious RAM Protocol," *In CCS*, 25 pages (2013).

Vaikuntanathan, "Computing Blindfolded: New Developments in Fully Homomorphic Encryption," *In 2011 IEEE 52nd Annual Symposium on Foundations of Computer Science*, 12 pages (2011).

Xie et al., "Practical Private Shortest Path Computation Based on Oblivious Storage," *In ICDE*, 12 pages (2016).

International Search Report and Written Opinion, International Application No. PCT/US2018/062207, 9 pages, dated Feb. 1, 2019.

Dachman-Soled et al., "Oblivious Network RAM and Leveraging Parallelism to Achieve Obliviousness," *In International Conference on the Theory and Application of Cryptology and Information Security*, 29 pages, Jan. 12, 2017, https://eprint.iacr.org/2015/073.pdf.

Dautrich Jr. et al., "Burst ORAM: Minimizing ORAM Response Times for Bursty Access Patterns," *In Proceedings of the 23rd USENIX Security Symposium*, 17 pages, Aug. 22, 2014, https://www.usenix.org/system/files/conference/usenixsecurity14/sec14-paper-dautrich.pdf.

International Preliminary Report on Patentability, International Application No. PCT/US2018/062207, 7 pages, dated May 26, 2020.

* cited by examiner

EFFICIENTLY QUERYING DATABASES WHILE PROVIDING DIFFERENTIAL PRIVACY

RELATED APPLICATIONS

This application claims priority under 35 U.S.C. § 119(e) of U.S. Provisional Patent Application No. 62/589,468 filed Nov. 21, 2017, entitled EFFICIENTLY QUERYING DATABASES WHILE PROVIDING DIFFERENTIAL PRIVACY, which is incorporated by reference herein in its entirety by reference.

FIELD

This application is directed towards systems, methods and devices employing various combinations of techniques related to differential privacy (DP) and oblivious RAM (ORAM) to efficiently query a database without compromising the security of the database or records stored in the database.

PARTIES TO JOINT RESEARCH AGREEMENT (1) Yaacov Nissim Kobliner, Professor of Computer Science at Georgetown University; (2) George Kollios, Professor of Computer Science at Boston University; and (3) Georgios Kellaris, Data Privacy Expert with TandemLaunch, Inc.

BACKGROUND

There is an interest in protecting against attacks to steal or replicate sensitive data by malicious parties. In some instances, data may be stored in databases, across social media sites, privately, etc. Often, however, databases are the preferred target. In these attacks, malicious parties may attempt to calculate the data content and structure of a database by monitoring answers to numerous encrypted queries in an attempt to re-construct the distribution of database records. These attacks are commonly known as "re-construction" attacks.

For example, by manipulating the "access pattern leakage" of a database (the returned query results), a malicious party could in principle deduce that the same encrypted record is returned by separate queries, thus providing insight into the content and structure of the database. Relatedly, the "volume pattern leakage" (which refers to the size of the result set for a query) has been shown to also potentially reconstruct (or partially reconstruct) a database. Other related attacks exist, such as re-construction link attacks that are usually directed towards social media sites in an effort to uncover user (and user-linked) information.

SUMMARY

In order to overcome of the vulnerabilities inherent to database information, the concept of differential privacy (DP) was developed, which in essence attempts to provide data privacy even in the presence of a malicious party by mathematically minimizing any single individual's data having an effect on the outcome of the malicious party's queries. Additionally, the concept of oblivious RAM (ORAM) has been introduced in concert with differential privacy to produce a powerful defense against re-construction attacks known as DP-ORAM. Oblivious RAM (ORAM) allows a client to conceal their access pattern to the database (or other remote storage) by continuously shuffling and re-encrypting data as they are accessed. Thus, in an ORAM protocol a malicious party can observe the physical storage locations accessed, but the ORAM algorithm ensures that the malicious party has a negligible probability of learning anything about the true (logical) access pattern. A drawback of the current DP-ORAM strategy is that current implementations of ORAM are not practically efficient as the ORAM protocol requires serial invocation (once for each record retrieved). This can create an undesirable processing overhead. Thus, it would be extremely valuable to reduce DP-ORAM latency.

In an example embodiment, a system comprises a plurality of oblivious random-access memories (ORAMs); and a database query server, wherein the query server performs operations, the operations comprising: storing separate database record subsets of a set of database records in the plurality of ORAMs, receiving a database query from a client, determining a number of the database records to be retrieved from the plurality of ORAMs that satisfies a differential privacy constraint, using the plurality of ORAMs to concurrently retrieve the determined number of database records from the separate database record subsets stored in the plurality of ORAMs, wherein the retrieved database records comprises one or more database records that match the received query and an additional one or more database records, and returning the one or more database records that match the received query to the client.

In a different or further embodiment, a computer-implemented method comprises: storing separate database record subsets of a set of database records in a plurality of ORAMs; receiving a database query; responsive to receiving the database query, determining a number of the database records to be retrieved from the plurality of ORAMs that satisfies a differential privacy constraint; concurrently retrieving the determined number of database records from the separate database record subsets stored in the plurality of ORAMs, wherein the retrieved database records comprise one or more database records that match the received query and an additional one or more database records; and returning the one or more database records that match the received query.

In a different or further embodiment, a non-transitory computer-readable medium stores executable instructions that, when executed by a computer, cause the computer to perform operations, the operations comprising: storing separate database record subsets of a set of database records in a plurality of ORAMs; receiving a database query; determining a number of the database records to be retrieved from the plurality of ORAMs that satisfies a differential privacy constraint; using the plurality of ORAMs to concurrently retrieve the determined number of database records from the separate database record subsets stored in the plurality of ORAMs, wherein the retrieved database records comprise one or more database records that match the received database query and an additional one or more database records, and returning the one or more database records that match the received database query.

These contributions can contribute towards making DP-ORAM systems applicable in real-life applications.

Further aspects of the invention will be brought out in the following portions of the specification, wherein the detailed description is for the purpose of fully disclosing preferred embodiments of the invention without placing limitations thereon.

DETAILED DESCRIPTION

Previous DP-ORAM technologies make use of a single ORAM storing a complete set of data items. Such technologies may be impractical for some applications, since all data access operations required for a given query must be handled by the single ORAM. Latency of the ORAM access operations can be reduced by distributing the set of data items across multiple, independent ORAMs and accessing the multiple ORAMs concurrently. However, accessing multiple ORAMs may introduce a privacy vulnerability. For example, if a malicious party can observe the ORAM access operations, the malicious party may be able to use patterns of ORAM access operations for particular queries to learn which ORAMs store particular records. The malicious party could systematically develop queries to isolate access to a particular ORAM and learn information specific to the records stored on that ORAM.

At least some of the embodiments of the technologies described herein solve these problems by using a differential privacy constraint to obfuscate the number of matching records retrieved from each ORAM for a given query. For example, subsets of a set of database records can be stored in a plurality of ORAMs such that a subset of database records is stored in each ORAM. When a database query is received, a number of database records that match the query can be identified for each of the ORAMs. A differential privacy constraint can then be used to determine an additional number of database records to be retrieved from each ORAM. Once all of the identified records are retrieved from the plurality of ORAMs, the additional records can be discarded. Thus, in at least some cases, ORAM access latency can be reduced by accessing the plurality of ORAMs concurrently (or in parallel), while the risk of information leakage from the ORAM access operations is reduced or eliminated by obfuscating the actual number of matching records retrieved from each ORAM.

In a different or further embodiment, a differential privacy index can be used to identify records to be retrieved from each ORAM for a given query. The differential privacy index can identify records to be retrieved from the plurality of ORAMs for the given query. The identified records can include the records that match the query, as well as a number of additional records. The number of additional records specified for each ORAM can be determined using the differential privacy constraint.

In a different or further embodiment, a separate differential privacy index can be created for each ORAM. The differential privacy index for a given ORAM can be created based on the subset of database records stored in the given ORAM. The differential privacy index for the given ORAM can identify any database records stored in the given ORAM's subset of database records which match a given query, along with a number of additional records to be retrieved from the ORAM for the given query. The number of additional records can be determined using the differential privacy constraint.

In at least some embodiments, the differential privacy constraint defines an upper bound on the total number of records to be retrieved from each ORAM. This can be advantageous in some scenarios to provide security against information leakage, while still providing acceptable query latency. For example, it may be possible to obfuscate the number of matching records retrieved from each ORAM by always returning all (or an arbitrarily large number of) records stored on each ORAM. However, for many applications this approach does not provide acceptable communication efficiency or query latency. By specifying an upper bound on the number of records to be retrieved from each ORAM, the differential privacy constraint can define a balance between security and communication efficiency. In at least some embodiments, the differential privacy constraint defines an upper bound that provides acceptable security against information leakage while also enforcing a minimum acceptable error in query accuracy.

Figure 1:
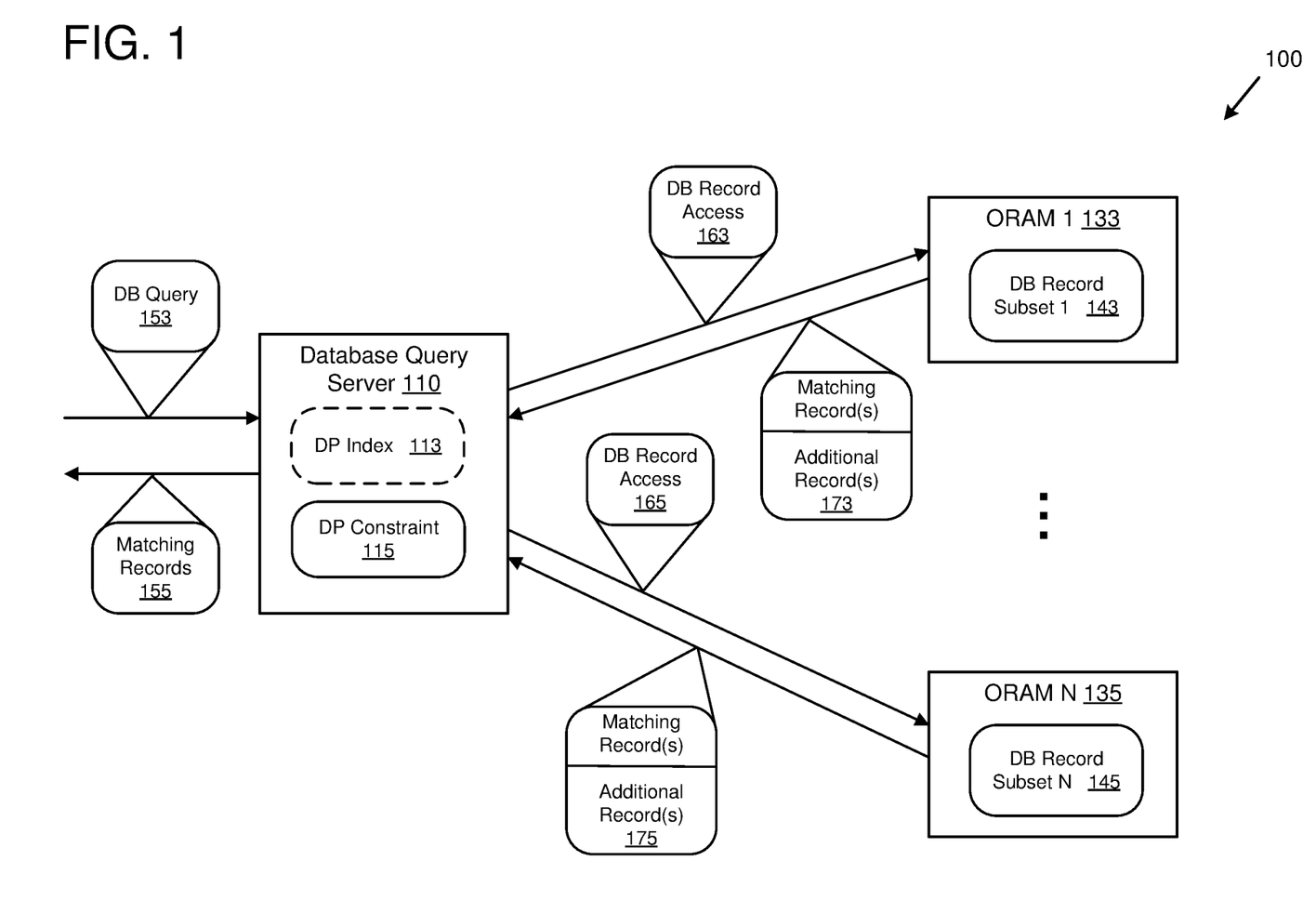
FIG. 1 is a system diagram depicting an example system comprising a database query server configured to access a plurality of oblivious random-access memories (ORAMs).

FIG. 1 is a system diagram depicting an example system 100 comprising a database query server 110 configured to access a plurality of oblivious random-access memories (ORAMs) 133-135.

An ORAM allows data to be accessed in a memory of a computing device without leaking any information about a memory access pattern (or guaranteeing that any information leakage will be below a specified security risk threshold). An ORAM can comprise one or more hardware and/or software components configured to interface with a physical random-access memory of a computing device. An ORAM can scramble memory address locations so that any two sequences of memory access operations are indistinguishable to a malicious party. Various ORAM implementations exist. Example ORAM implementations include, but are not limited to, Path-ORAM, TP-ORAM, TaORAM, Square Root ORAM, Hierarchical ORAM, Binary-Tree ORAM, and Interleave Buffer Shuffle Square Root ORAM. Use of an ORAM to obfuscate memory access can incur communication and/or storage overhead. The Path ORAM, TP-ORAM, and TaORAM protocols have communication and storage overheads of 0(log n) and 0(n), respectively.

Each of the plurality of ORAMs 133-135 contains a subset of database records from a set of database records (not shown). For example, the ORAM 133 stores database records subset 143, ORAM 135 stores database records subset 145, etc. While two ORAMs are depicted in FIG. 1, this is not intended to be limiting. Other numbers of ORAMs are possible. In at least some embodiments, the number of ORAMs can be based on a specified minimum latency requirement.

The database record subsets may be, but are not necessarily, similar in size. Various techniques may be used to distribute the database records across the plurality of ORAMs 133-135. For example, a random distribution may be used to assign database records to various ORAMs of the plurality of ORAMs 133-135. In a particular embodiment, each record in the set of database records is processed using a hash function. For a given database record, the result of the hash function is modulated by the number of ORAMs in the plurality of ORAMs 133-135 and the result of the modulation identifies the ORAM in which the given database record is to be stored.

The database query server 110 is configured to process database queries, at least in part, by retrieving database records from the database records subsets 143-145 stored in the plurality of ORAMs 133-135. The database query server 110 is configured to access the plurality of ORAMs 133-135 concurrently. For example, the database query server 110 can be configured to use multiple threads and/or processes to access the plurality of ORAMs 133-135 concurrently (or in parallel).

When retrieving records from the plurality of ORAMs 133-135, the database query server 110 uses a differential privacy constraint 115 to prevent (or reduce the risk of) information leakage based on the database query server's access operations. For a given database query, the differential privacy constraint 115 can be used to determine a number of database records to be retrieved from the plurality of ORAMs 133-135. The database query server 110 can determine the records in the set of database records that match a given database query. The database query server 110 can then identify ORAMs, of the plurality of ORAMs 133-135, in which the matching database records are stored. Using the differential privacy constraint 115, the database query server 110 can then determine a number of additional records to be retrieved from each of the plurality of ORAMs 133-135 in order to prevent (or reduce) information leakage. For example, for a given query, the differential privacy constraint 115 can specify a minimum and/or maximum number of records to be retrieved from each ORAM. In at least some scenarios, the differential privacy constraint 115 is used to specify a number of records to be retrieved from each ORAM, such that a same (or similar) number of records is retrieved from each ORAM in the plurality of ORAMs 133-135. For example, all of the records retrieved from one ORAM may match the given database query, while for another ORAM some of the retrieved records may match the given database query while other retrieved records do not, and for yet another ORAM none of the retrieved records may match the given database query.

Various differential privacy techniques can be used to define the differential privacy constraint 115. Example differential privacy techniques include, but are not limited to, pure differential privacy, approximate differential privacy, concentrated differential privacy, zero-concentrated differential privacy, and Renyi differential privacy.

In at least some embodiments, the database query server 110 comprises a differential privacy index 113. The differential privacy index 113 can be constructed using the differential privacy constraint 115. The differential privacy index 113 can identify, for a given query, which memory locations in the plurality of ORAMs 133-135 should be accessed in order to retrieve the database records that match the given query and also satisfy the differential privacy constraint 115.

In FIG. 1, the database query server 110 is configured to receive a database query 153. The database query 153 can be received, for example, from a client (not shown). The client can comprise one or more hardware and/or software components of a separate computing device. In such an embodiment, the database query 153 can be received via one or more wired and/or wireless communication channels (such as a computer network connection, etc.). Alternatively, the client and the database query server 110 can be part of a same computing device. For example, the client and the database query server 110 can comprise separate software and/or hardware components that are separated by a logical and/or physical security boundary in order to prevent the client from exercising direct control over the database query server 110.

The database query server 110 uses the differential privacy constraint 115 to determine a number of the database records to be retrieved from the plurality of ORAMs 133-135 that satisfies the differential privacy constraint 115. The database query server 110 concurrently transmits access operations 163-165 to the plurality of ORAMs 133-135 to retrieve the determined number of database records from the separate database records subsets 143-145 stored in the plurality of ORAMs 133-135. The retrieved database records comprise one or more database records that match the query 153 and an additional one or more database records. For example, the database records 173 retrieved from the ORAM 133 comprise one or more records that match the database query 153 and one or more additional records. The database records 175 retrieved from the ORAM 135 also comprise one or more records that match the database query 153 and one or more additional records.

The additional records can comprise records that do not match the database query 153. Additionally or alternatively, the additional records can comprise one or more copies of matching records. The returned records can be encrypted so that the return of multiple copies of matching records cannot be detected by an observer. Additionally or alternatively, the additional records can comprise dummy records that do not contain useful data, but instead are stored in the plurality of ORAMs 133-135 for the purpose of satisfying the differential privacy constraint 115. In at least some embodiments, the type of the additional record that is retrieved from the plurality of ORAMs 133-135 can be specified by the client.

The database query server 110 returns the one or more database records 155 that match the query 153 to the client. For example, the database query server 110 can be configured to receive the records 173-175 from the plurality of ORAMs 133-135, discard the one or more additional records, and return the remaining one or more matching records 155 to the client. Alternatively, the database query server 110 can be configured to transmit the one or more matching records and the one or more additional records to the client. In such an embodiment, the client can be configured to discard the one or more additional records. For example, in a scenario where the one or more additional records include encrypted copies of the one or more matching records, the client can decrypt the records and discard any redundant copies of matching records.

In at least some scenarios, a received query requests an aggregate operation based on database records that match a given predicate (e.g., requesting a count of (or average age of) people for which a given condition is true, etc.). In such a scenario, the database server 110 can retrieve the database records from the plurality of ORAMs 133-135 that match the query predicate, along with a number of additional records in order to satisfy the differential privacy constraint 115. The database query server 110 can then compute the requested aggregate operation based on the retrieved records. In at least some embodiments, the one or more additional records are included in the aggregate operation. For example, the differential privacy constraint 115 can include an accuracy value that restricts an amount by which the retrieved additional records can skew the accuracy of the aggregate operation. In such an embodiment, a total number of records to be retrieved from the plurality of ORAMs 133-135 can be determined that satisfies the accuracy value and also keeps the risk of information leakage below an acceptable threshold.

The database query server 110 can be configured to use separate threads and/or processes to concurrently access the plurality of ORAMs 133-135. In at least some embodiments, the database query server 110 and the plurality of ORAMs 133-135 can be part of a same computing device. In such an embodiment, the separate threads and/or processes can be used to access the plurality of ORAMs 133-135 directly. Alternatively, the database query server 110 and the plurality of ORAMs 133-135 can be distributed across multiple computing devices. For example, at least some of the plurality of ORAMs 133-135 can be executing on separate servers. In such an embodiment, the database query server 110 can be configured to use the separate threads and/or processes to communicate with the at least some of the plurality of ORAMs 133-135 via one or more computer networks.

In at least some embodiments, the database query server 110 is configured to batch multiple database queries received from a client. Batching the multiple database queries can comprise determining a union of database records that match one or more of the multiple database queries and using the union of records to determine a number of database records to be retrieved from the plurality of the ORAMs 133-135 that satisfies the differential privacy constraint 115. For example, two or more of the multiple queries may match overlapping ranges of database records. Thus, a union of the database records that match the multiple database queries may represent a smaller total number of database records that would be retrieved if each of the multiple database queries were executed separately. In at least some cases, this can also reduce the number of additional records that must be retrieved from each ORAM to satisfy the differential privacy constraint 115. For example, processing each query separately may require more additional records to be retrieved from the ORAMs 133-135 than is required to obfuscate the union of the database records when processing the queries as a batch. Thus, in at least some scenarios, batching database queries can improve the efficiency of the communication between the database query server 110 and the plurality of ORAMs 133-135 by reducing the overall number of database records that must be retrieved from the plurality of ORAMs.

Figure 2:
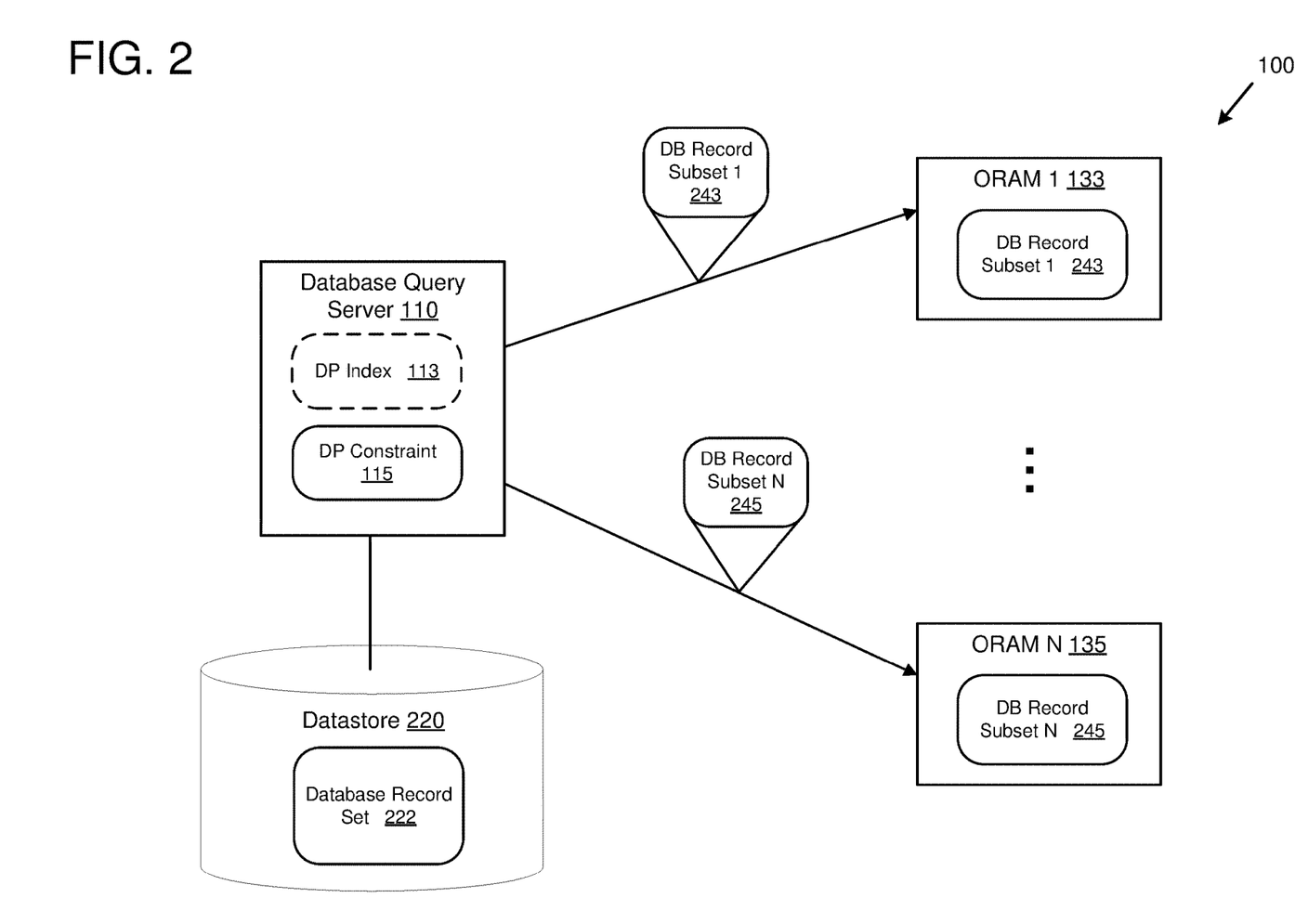
FIG. 2 is a system diagram depicting an example system comprising a database query server configured to populate a plurality of ORAMs.

FIG. 2 is a system diagram depicting the example system 100 comprising the database query server 110 configured to populate the plurality of ORAMs 133-135. The database query server 110 can be configured to retrieve a database record set 222 from a datastore 220 and to store subsets 243-245 of the database racket set 222 in the plurality of ORAMs 133-135. The datastore 220 can be part of a database system (such as a relational database management system, etc.). Additionally or alternatively, the datastore 220 can comprise one or more computer readable media. The database records that 222 can represent all or part of the data stored in a database. For example, the database record set 222 can comprise a plurality of records from one or more database tables.

The database query server 110 can distribute the records in the database record set 222 evenly across the plurality of ORAMs 133-135 such that a same, or similar, number of database records is stored in each of the database record subsets 243-245. In at least some embodiments, the database query server 110 can be configured to distribute the database records randomly amongst the plurality of ORAMs 133-135. The database query server 110 can encrypt the database records before storing them in the plurality of ORAMs 133-135. The encrypted database records can be stored in a randomized order so that a malicious party observing the storage operations cannot determine which database records were stored in which of the plurality of ORAMs 133-135.

In at least some embodiments, after storing the database records in the plurality of ORAMs 133-135, the database query server 110 can generate the differential privacy index 113 using the differential privacy constraint 115. The differential privacy index 113 can be used to identify records in the plurality of ORAMs 133-135 that should be retrieved in response to receipt of a database query in order to satisfy the differential privacy constraint 115. For example, for a given database query the differential privacy index 113 can identify database records to be retrieved from each of the ORAMs 133-135. A database record can be retrieved, for example, by an ORAM identifier for the ORAM where the database record is stored and a memory location identifier (such as a memory address) that can be used by the ORAM to retrieve the database record. In some embodiments, a single differential privacy index 113 is created for the entire database record set 222.

Alternatively, a separate differential privacy index can be created for each of the database record subsets 243-245. In such an embodiment, the separate differential privacy indices can be accessed concurrently; whereas, in an embodiment with a single differential privacy index, the differential privacy index look up operations must be completed before concurrent data access operations can commence. However, use of a single differential privacy index may improve communication efficiency since the determination of the number of records to be retrieved from each ORAM can be based on a consolidated view of the entire record set 222 instead of the isolated views of the record subsets 243-245 stored in the separate ORAMs 133-135.

The differential privacy index 113 can be constructed using a differential privacy sanitizer (not shown). For a given collection of database queries, the differential privacy sanitizer can construct the differential privacy index 113 such that all queries in the collection of database queries can be answered with a given accuracy, while also satisfying the privacy restrictions defined in the differential privacy constraint 115.

For example, if two database record sets $D_1 \in X^n$ and $D_2 \in X^n$ over a domain X are considered to be neighboring (denoted $D_1 \sim D_2$) if they differ in exactly one database record, then a randomized algorithm A can be considered to be ($\epsilon$, $\delta$)-differentially private if, for all $D_1 \sim D_2 \in X^n$, and for all subsets 0 in the output space of A, $$Pr[A(D_1) \in 0] \leq \exp(\epsilon) \cdot Pr[A(D_2) \in 0] + \delta,$$

wherein, the probability (Pr) over the randomness of the algorithm A.

For a collection of database queries Q, a ($\epsilon$, $\delta$, $\alpha$, $\beta$)-differentially private sanitizer for Q can be defined as a pair of algorithms (A, B), such that:

A is ($\epsilon$, $\delta$)-differentially private, and
Given an input database record set $D=(d_1, \ldots, d_n) \in X^n$,
A produces a data structure DS (such as differential privacy index 113) such that, with probability $1-\beta$, for all database queries $q \in Q$, $|B(DS, q) - \Sigma_i^n q(d_i)| \leq \alpha$.

Here, $\alpha$ represents a maximum allowed deviation in accuracy between the correct response for query q and the result of algorithm B (such as a maximum number of additional records to be retrieved from the ORAMs when processing q). $\beta$ represents a risk of potential information leakage. The values $\epsilon$, $\delta$, $\alpha$, and/or $\beta$ can be specified in the differential privacy constraint 115. In at least some embodiments, an implementation of the algorithm A can be specified in the differential privacy constraint as well.

In the example given above, the query q represents a predicate wherein q ($d_i$) produces a value of 1 if database record $d_i$ matches the predicate, and produces a value of 0 otherwise. Thus, the aggregator $\Sigma_i^n$ q($d_i$) represents a count of the records in D that match the predicate. The algorithm B produces a count of the records retrieved from one or more of the ORAMs 133-135 for q using DS. In an embodiment where a single differential privacy index is desired, D represents the full database record set 222, A is used to produce a single differential privacy index (DS) for the full record set 222. In an embodiment where a separate index is produced for each ORAM, A is used to produce a differential privacy index for each record subset 243-245. In such an embodiment, B can be executed for each ORAM's differential privacy index.

The database records stored in the plurality of ORAMs 133-135 can be stored in an encrypted format. In at least some embodiments, the storage process can enforce a uniform record length for the database records. This may be advantageous in some scenarios, as the uniform record length can obfuscate the actual length of the data stored in each record. However, in some scenarios, using such a fixed-length record strategy can waste storage space. For example, when the encrypted records are required to be the same length, each record must be at least as long as the longest record. In scenarios where there is a high degree of variability in record length, making each record as long as the longest record may consume a large amount of storage space.

This can be addressed by storing the database records in the plurality of ORAMs 133-135 with variable record lengths. For example, separate ORAMs, of the plurality of ORAMs 133-135, can be designated to store records with different lengths. For example, if record lengths are defined in blocks (with a maximum record length designated as L blocks), then the plurality of ORAMs 133-135 can be associated with different block lengths. In a particular embodiment, l different record lengths are defined, where l=0($\log_2$ L). This results in record lengths of $2^i$ for i=0, . . . , l. The embodiment where l=0 ($\log_2$ L) results in a maximum factor 2 increase in storage volume. It is possible to choose a basis other than 2. For example, the number of record lengths can be chosen based on a distribution of record lengths of the database records.

The database records can be padded up to the closest defined record length and stored in an ORAM associated with that record length. After padding the records, the records can be encrypted. In at least some embodiments, an ORAM can be created for each defined record length. Additionally or alternatively, multiple ORAMs can be associated with certain record lengths. For example, if a distribution of records across the defined record lengths is not uniform, additional ORAMs may be needed for certain record lengths to create a uniform distribution of the database records across the ORAMs.

Figure 3:
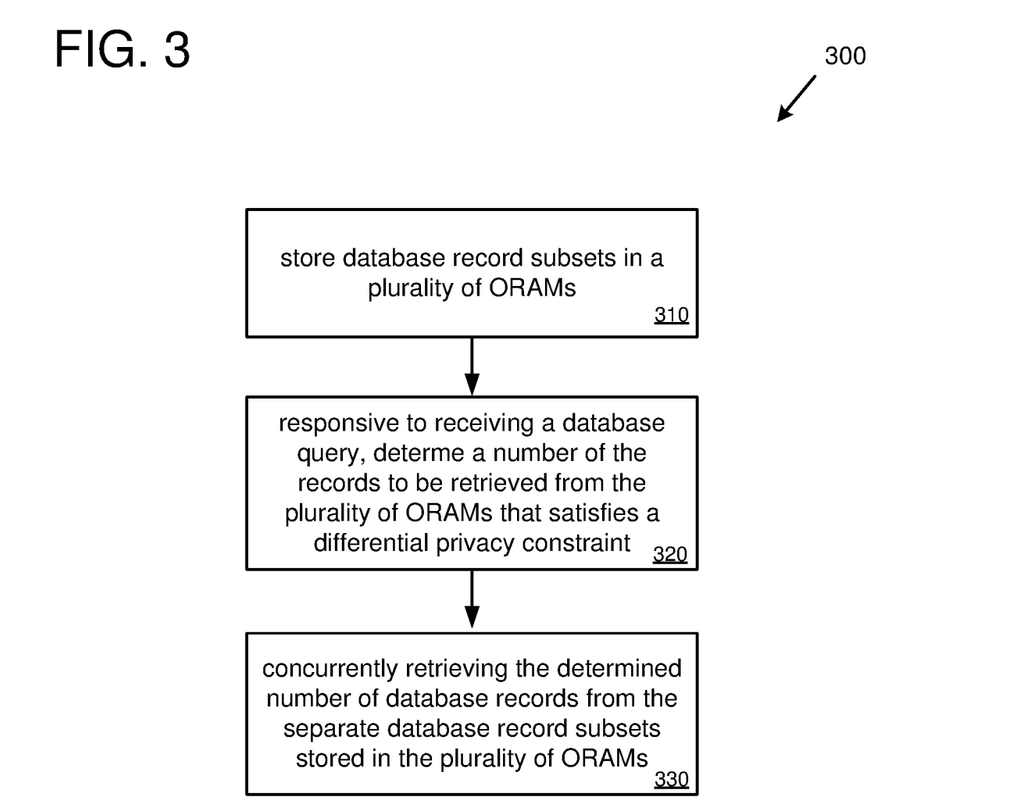
FIG. 3 is a flowchart of an example method for efficiently processing a database query while maintaining differential privacy.

FIG. 3 is a flowchart of an example method 300 for efficiently processing a database query while maintaining differential privacy. Any of the example systems described herein can be used to perform the example method 300. For example, system 100 can be used to perform all or part of the example method 300.

At 310, separate database record subsets of a set of database records are stored in a plurality of ORAMs. For example, the database query server 110 can store record subsets 243-245 of the database record set 222 in the plurality of ORAMs 133-135. The database record subsets can be defined such that a same or similar number of database records is stored in each of the plurality of ORAMs.

Subsequent to storing the database record subsets in the plurality of ORAMs, a database query can be received. For example, the database query can be database query 153 received by the database query server 110. The query can comprise a request for one or more of the database records in the set of database records that match search criteria (such as one or more predicates) defined in the query. Additionally or alternatively, the query can comprise a request for an aggregate value based on the database records that match the search criteria.

At 320, responsive to receiving the database query, a number of the database records to be retrieved from the plurality of ORAMs that will satisfy differential privacy constraint is determined. For example, the database query server 110 can identify database records to be retrieved from the plurality of ORAMs 133-135 that will satisfy the differential privacy constraint 115. In at least some embodiments, a data structure created using a differential privacy sanitizer (such as the differential privacy index 113) can be used to identify the records to be retrieved. A number of records stored in the plurality of ORAMs that match the received database query can be determined. The differential privacy constraint can be used to determine an additional number of database records to be retrieved from each of the plurality of ORAMs in order to prevent (or reduce the risk of) information leakage resulting from ORAM access operations.

In at least some embodiments, determining the number of database records to be retrieved from the plurality of ORAMs that satisfies the differential privacy constraint comprises determining the maximum number of records to be retrieved from a given ORAM of the plurality of ORAMs. For example, a maximum number of records to be retrieved from each of the plurality of ORAMs can be determined such that a number of database records retrieved from each ORAM is equalized. In some scenarios this may mean a greater number of additional records are retrieved from some ORAMs while a smaller number of additional records are retrieved from other ORAMs. For example, for an ORAM containing a larger number of records that match the given query, fewer or no additional records may be retrieved; whereas for an ORAM containing a smaller number records that match the given query, more additional records may be retrieved. For an ORAM containing no matching records, all retrieved records may be classified as additional records.

At 330, the determined number of database records are concurrently retrieved from the separate database record sets stored in the plurality of ORAMs. The retrieved database records comprise one or more database records that match the received query and an additional one or more database records. For example, the database query server 110 can concurrently retrieve database records 173-175 from the plurality of ORAMs 133-135. The concurrent retrieval can involve the use of multiple threads and/or processes. A thread (or child process) can be spawned for each of the plurality of ORAMs. For example, the database query server 110 can spawn a separate thread (or child process) for each of the plurality of ORAMs 133-135. The separate threads (or child processes) can then be used to retrieve identified database records from the corresponding ORAMs. Each of the separate threads (or processes) can operate independently to retrieve identified database records from a separate ORAM. For example, one thread can be used to perform database record access operations 163 to retrieve the database records 173 from the ORAM 133, while another thread can be used to concurrently perform database record access operations 165 to retrieve the database records 175 from the ORAM 135.

A computing system can be said to be concurrent if it can support two or more actions in progress at a same time, whereas the computing system can be said to be parallel if it can support two or more actions executing simultaneously. Thus, two threads (or processes) are concurrent if they are in progress at a given time, even if they are not executing simultaneously. In a computing environment comprising multiple processor cores, the separate threads (or processes) may execute simultaneously, and thus be parallel, at least part of the time.

After the database records are retrieved from the plurality of ORAMs, one or more database records that match the received query can be returned. For example, the database query server 110 can return the matching records 155 in response to the database query 153. In at least some embodiments, the database query is received from a separate client computing device. In such an embodiment, the one or more database records that match the received query can be returned to the client computing device.

In some embodiments, the additional database records retrieved from the plurality of ORAMs are discarded and only the matching database records are returned. Alternatively, all database records retrieved from the plurality of ORAMs, including the additional records, can be returned. In such an embodiment, a downstream process or computing device can be configured to filter the additional records out of the query results.

Figure 4:
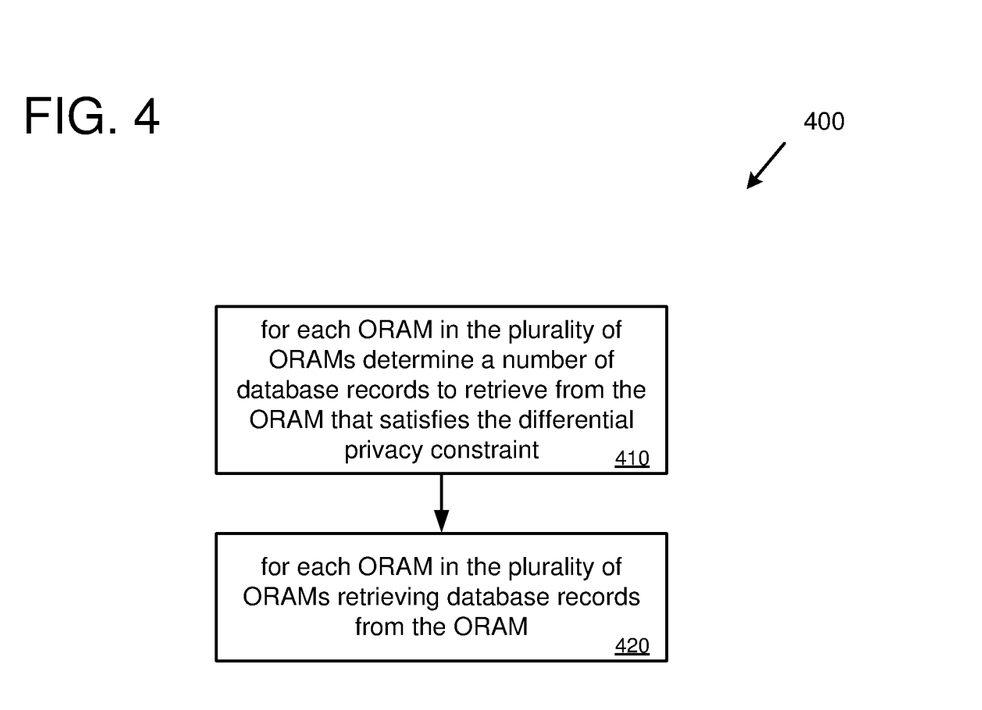
FIG. 4 is a flowchart of an example method for retrieving data from a plurality of ORAMs while maintaining differential privacy.

FIG. 4 is a flowchart of an example method 400 for retrieving data from a plurality of ORAMs while maintaining differential privacy. Any of the example systems described herein can be used to perform the example method 400. For example, the example system 100 can be used to perform all or part of the example method 400.

At 410, for each ORAM in the plurality of ORAMs, a number of database records to retrieve from the ORAM is determined that satisfies a differential privacy constraint. For a given ORAM, the number of database records stored in the ORAM that match the database query can be determined. A number of additional database records to be retrieved from the ORAM in order to satisfy the differential privacy constraint can then be determined using the number of matching records. For example, the database query server 110 can be configured to use a differential privacy sanitizer to generate a separate differential privacy index for each of the plurality of ORAMs 133-135. For a given ORAM, of the plurality of ORAMs 133-135, the corresponding differential privacy index can be used to identify database records stored in the ORAM (including matching records and additional records) to be retrieved from the ORAM in response to the query.

In at least some embodiments, a maximum number of records to be retrieved from each ORAM is determined. For example, let $X_i=1$ if a database record i that matches a database query q is in a given ORAM, and 0 otherwise. If the database records are randomly assigned to the plurality of ORAMs, then $Pr[X_i=1]=1/m$ (i.e., the probability that a given record matching the query is in the given ORAM is 1 in m), where m is the number of ORAMs. If $k_0$ total database records match the database query q, then a maximum number of records to be retrieved from the given ORAM in order to answer q can be bounded as follows:

$$Pr\left[\sum_{i=1}^{k_0} X_i > (1+\gamma)\frac{k_0}{m}\right] \le \exp\left(-\frac{k_0\gamma^2}{3m}\right)$$

Here, $$(1+\gamma)\frac{k_0}{m}$$

represents the maximum number of database records to be retrieved from the given ORAM. The value of $\gamma$ can be determined such that $$\exp\left(-\frac{k_0\gamma^2}{3m}\right)$$

is less than a specified constraint value $\beta$. Thus, the value of $\gamma$ can be computed as $$\sqrt{\frac{-3m\log\beta}{k_0}}.$$

The constraint value of $\beta$ can be specified in the differential privacy constraint. Additionally or alternatively, the value $\gamma$ can be specified in the differential privacy constraint.

The operations to determine the maximum number of database records to be retrieved can be repeated for each ORAM in the plurality of ORAMs.

At 420, for each ORAM in the plurality of ORAMs, database records are retrieved from the ORAM. The records retrieved from a given ORAM comprise one or more database records that match the database query and an additional one or more database records, such that a combined number of the one or more matching database records and the one or more additional database records is equal to the determined number of database records to retrieved from the given ORAM that satisfies the differential privacy constraint. Database records can be retrieved from the plurality of ORAMs concurrently using multiple threads and/or processes. For example, the database query server 110 can use separate threads and/or processes to retrieve database records from separate ORAMs. A given thread (or process) can be used to retrieve records from a given ORAM that match the database query, and to retrieve a number of additional records such that the total number of records retrieved from the given ORAM satisfies the differential privacy constraint. In at least some embodiments, the additional records retrieved comprise database records that do not match the database query. Additionally or alternatively, the additional records can include additional copies of records that match the database query. The records can be returned in an encrypted format so that the presence of duplicate records is not detectable.

Figure 5:
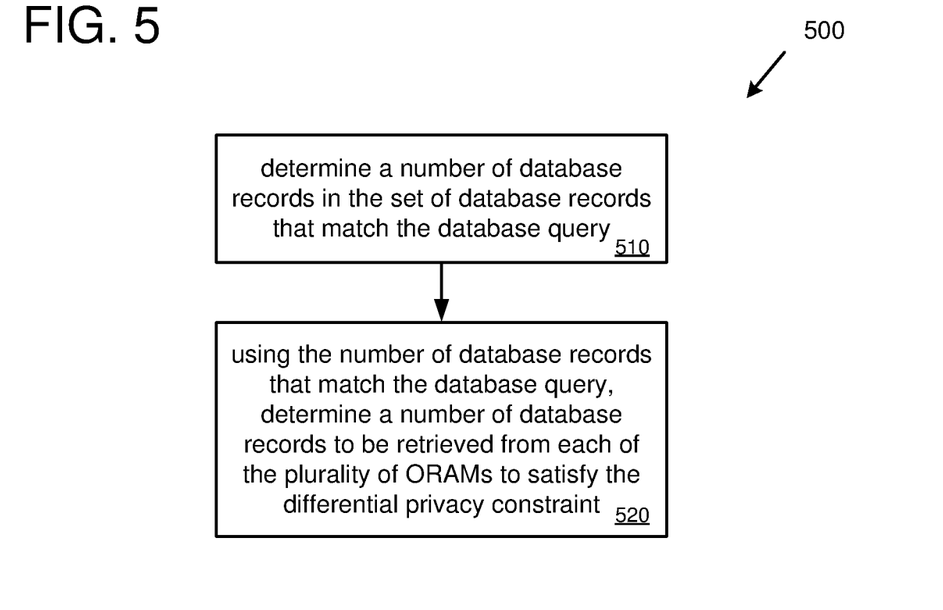
FIG. 5 is a flowchart of another example method for retrieving data from a plurality of ORAMs while maintaining differential privacy.

FIG. 5 is a flowchart of another example method 500 for retrieving data from a plurality of ORAMs while maintaining differential privacy. Any of the example systems described herein can be used to perform the example method 500. For example, the example system 100 can be used to perform all or part of the example method 500.

At 510, a number of database records in a set of database records that match a given database query is determined. For example, the database query server 110 can determine a number of database records in the database record set 222 that match the given database query (e.g., database query 153). In at least some embodiments, the number of database records that match the given database query can be determined using a data structure created using a differential privacy sanitizer (such as the differential privacy index 113). Additionally or alternatively, the set of database records (e.g., database record set 222) can be used to identify database records that match the given query.

At 520, the number of database records that match the database query is used to determine a number of database records to be retrieved from each of the plurality of ORAMs to satisfy a differential privacy constraint. For example, the database query server 110 can use the number of database records that match the database query to determine a total number of database records to retrieve from each of the plurality of ORAMs 133-135 to satisfy the differential privacy constraint 115.

In at least some embodiments, the total number of database records to be retrieved can be defined as a noisy number of records $\hat{k}_0$ that is defined as a function of the number of database records that match the database query $k_0$ and a specified value $\epsilon$. The value $\epsilon$ can be specified as part of the differential privacy constraint. The value $\epsilon$ can be a same $\epsilon$ that is used to define a $(\epsilon, \delta, \alpha, \beta)$-differentially private sanitizer as described above.

In at least some scenarios, $\hat{k}_0$ can be defined differently for different types of database queries. For example, for a collection of range queries $Q_r$ (where each query returns a collection of database records within a specified range), $\hat{k}_0$ may be defined as $\hat{k}_0 = k_0 + \log^{1.5} N/\epsilon$, where N represents the number of queries in $Q_r$. For a collection of point queries $Q_p$ (where each query returns a collection of one or more database records that agree with a specific value (for example by using a key, a unique record identifier, etc.)), $\hat{k}_0$ may be defined as $\hat{k}_0 = k_0 + \log N/\epsilon$, where N represents the number of queries in $Q_p$. For a collection of attribute queries $Q_a$ (where each query searches over one or more record attributes), $\hat{k}_0$ may be defined as $\hat{k}_0 = k_0 + k/\epsilon$, where k is the number of attributes searched. These definitions of $\hat{k}_0$ are provided as examples and are not intended to be limiting. Other definitions of $\hat{k}_0$ are possible.

Once the noisy number of records $\hat{k}_0$ is determined, a number of database records to be retrieved from each ORAM can be determined. For example, an upper bound of $$(1+\gamma)\frac{\hat{k}_0}{m}$$

database records can be retrieved from each ORAM, where m is the number of ORAMs. This can ensure that a same or similar number of database records is retrieved from each ORAM. $\gamma$ can be defined as $$\sqrt{\frac{-3m\log\beta}{k_0}},$$

as described above. In at least some embodiments, $\beta$, $\gamma$, and/or $\epsilon$ can be specified as part of the differential privacy constraint.

Figure 6:
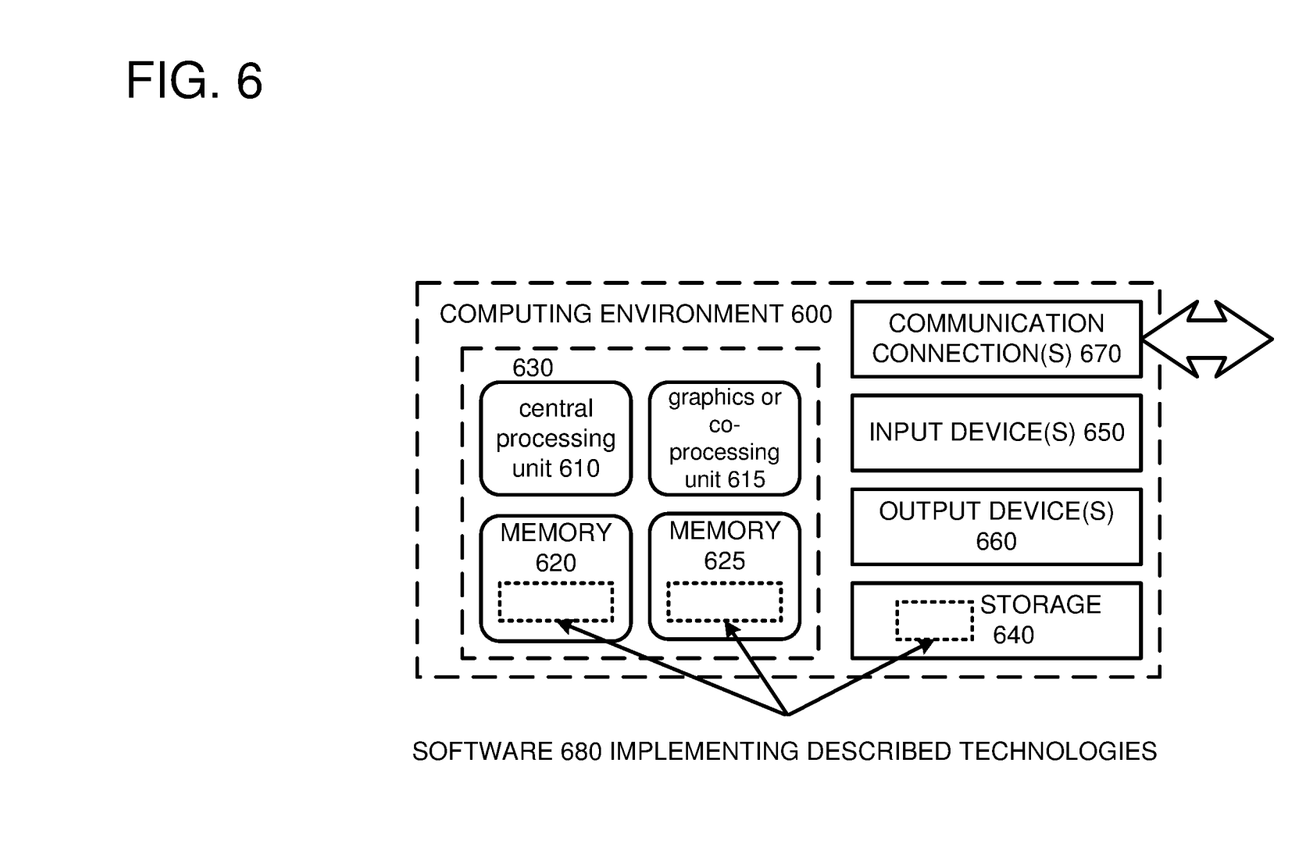
FIG. 6 is a diagram depicting a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

In at least some embodiments, the memory 620 and/or the memory 625 can be an ORAM as described herein.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

In at least some embodiments, the computing environment 600 can be used as a computing device, database query server, and/or client as described herein.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein. In at least some embodiments, the tangible storage 640 can comprise all or part of a datastore as described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, the communication connection(s) can be used to access one or more ORAMs as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
a plurality of oblivious random-access memories (ORAMs), wherein the plurality of ORAMs are executing on multiple servers; and
a database query server, wherein the query server is configured to communicate with the plurality of ORAMs via a computer network and performs operations, the operations comprising:
storing separate database record subsets of a set of database records in the plurality of ORAMs,
receiving a database query from a client,
determining a number of the database records to be retrieved from the plurality of ORAMs that satisfies a differential privacy constraint,
using the plurality of ORAMs to concurrently retrieve the determined number of database records from the separate database record subsets stored in the plurality of ORAMs, wherein the retrieved database records comprises one or more database records that match the received query and an additional one or more database records, and
returning the one or more database records that match the received query to the client.

2. The system of claim 1, wherein:
the determining the number of the database records to be retrieved from the plurality of ORAMs that satisfies the differential privacy constraint comprises, for each ORAM in the plurality of ORAMs:
determining a number of database records to retrieve from the ORAM that satisfies the differential privacy constraint; and
the concurrently retrieving the determined number of database records from the separate database record subsets stored in the plurality of ORAMs comprises, for each ORAM in the plurality of ORAMs:
retrieving database records from the ORAM, wherein the retrieved records comprise one or more database records that match the database query and an additional one or more database records, such that the combined number of the one or more matching database records and the one or more additional database records is equal to the determined number of database records to retrieve from the ORAM that satisfies the differential privacy constraint.

3. The system of claim 1, wherein the determining the number of the database records to be retrieved from the plurality of ORAMs that satisfies the differential privacy constraint comprises:
   determining a number of database records in the set of database records that match the database query; and
   using the number of database records that match the database query, determining a number of database records to be retrieved from each of the plurality of ORAMs to satisfy the differential privacy constraint.

4. The system of claim 1, wherein the operations further comprise:
   receiving multiple database queries from the client; and
   batching the multiple database queries, wherein the batching comprises:
      determining a union of database records that match one or more of the multiple database queries,
      using the union of records to determine the number of the database records to be retrieved from the plurality of ORAMs that satisfies the differential privacy constraint,
      using the plurality of ORAMs to concurrently retrieve the determined number of database records from the separate database record subsets stored in the plurality of ORAMs, wherein the retrieved database records comprises one or more database records in the union of records and an additional one or more database records, and
      returning the union of records to the client.

5. The system of claim 1, wherein the differential privacy constraint is an approximate differential privacy constraint.

6. The system of claim 1, wherein determining the number of the database records to be retrieved from the plurality of ORAMs that satisfies the differential privacy constraint comprises determining a maximum number of records to be retrieved from a given ORAM of the plurality of ORAMS.

7. The system of claim 6, wherein the maximum number of records to be retrieved from the given ORAM is bounded by the equation:

$$Pr\left[\sum_{i=1}^{k_0} X_i > (1+\gamma)\frac{k_0}{m}\right] \leq \exp\left(-\frac{k_0 \gamma^2}{3m}\right)$$

wherein m is a total number of database records in the set of database records, $k_0$ is a total number of the database records that match the database query, $X_i$ has a value of 1 if a given database record i is stored in the given ORAM, and a value $\gamma$ is determined such that $$\exp\left(-\frac{k_0 \gamma^2}{3m}\right)$$

is less than a specified constraint value.

8. A computer-implemented method, comprising:
   storing separate database record subsets of a set of database records in a plurality of oblivious random-access memories (ORAMs);
   receiving a database query;
   responsive to receiving the database query, determining a number of the database records to be retrieved from the plurality of ORAMs that satisfies a differential privacy constraint, wherein determining the number of the database records to be retrieved from the plurality of ORAMs that satisfies the differential privacy constraint comprises determining a maximum number of records to be retrieved from a given ORAM of the plurality of ORAMS;
   concurrently retrieving the determined number of database records from the separate database record subsets stored in the plurality of ORAMs, wherein the retrieved database records comprise one or more database records that match the received query and an additional one or more database records; and
   returning the one or more database records that match the received query.

9. The method of claim 8, wherein:
   the determining the number of the database records to be retrieved from the plurality of ORAMs that satisfies the differential privacy constraint comprises, for each ORAM in the plurality of ORAMs determining a number of database records to retrieve from the ORAM that satisfies the differential privacy constraint; and
   the concurrently retrieving the determined number of database records from the separate database record subsets stored in the plurality of ORAMs comprises, for each ORAM in the plurality of ORAMs retrieving database records from the ORAM, wherein the retrieved records comprise one or more database records that match the database query and an additional one or more database records, such that the combined number of the one or more matching database records and the one or more additional database records is equal to the determined number of database records to retrieve from the ORAM that satisfies the differential privacy constraint.

10. The method of claim 8, wherein the determining the number of the database records to be retrieved from the plurality of ORAMs that satisfies the differential privacy constraint comprises:
   determining a number of database records in the set of database records that match the database query; and
   using the number of database records that match the database query, determining a number of database records to be retrieved from each of the plurality of ORAMs to satisfy the differential privacy constraint.

11. The method of claim 8, wherein the additional one or more database records comprise database records that do not match the database query.

12. The method of claim 8, wherein the concurrently retrieving the determined number of database records from the separate database record subsets stored in the plurality of ORAMs comprises accessing the plurality of ORAMs via a computer network.

13. The method of claim 8, wherein the differential privacy constraint is a concentrated differential privacy constraint.

14. A non-transitory computer-readable medium storing executable instructions that, when executed by a computer, cause the computer to perform operations, the operations comprising:
   storing separate database record subsets of a set of database records in a plurality of oblivious random-access memories (ORAMs);
   receiving a database query;
   determining a number of the database records to be retrieved from the plurality of ORAMs that satisfies a differential privacy constraint, wherein determining the number of the database records to be retrieved from the plurality of ORAMs that satisfies the differential privacy constraint comprises determining a maximum number of records to be retrieved from a given ORAM of the plurality of ORAMS;

using the plurality of ORAMs to concurrently retrieve the determined number of database records from the separate database record subsets stored in the plurality of ORAMs, wherein the retrieved database records comprise one or more database records that match the received database query and an additional one or more database records, and returning the one or more database records that match the received database query.

15. The computer-readable medium of claim 14, wherein:

the determining the number of the database records to be retrieved from the plurality of ORAMs that satisfies the differential privacy constraint comprises, for each ORAM in the plurality of ORAMs determining a number of database records to retrieve from the ORAM that satisfies the differential privacy constraint; and the concurrently retrieving the determined number of database records from the separate database record subsets stored in the plurality of ORAMs comprises, for each ORAM in the plurality of ORAMs:

retrieving database records from the ORAM, wherein the retrieved records comprise one or more database records that match the database query and an additional one or more database records, such that the combined number of the one or more matching database records and the one or more additional database records is equal to the determined number of database records to retrieve from the ORAM that satisfies the differential privacy constraint.

16. The computer-readable medium of claim 14, wherein the determining the number of the database records to be retrieved from the plurality of ORAMs that satisfies the differential privacy constraint comprises:

determining a number of database records in the set of database records that match the database query; and using the number of database records that match the database query, determining a number of database records to be retrieved from each of the plurality of ORAMs to satisfy the differential privacy constraint.

17. The computer-readable medium of claim 14, wherein the maximum number of records to be retrieved from each of the plurality of ORAMs is determined such that a number of database records retrieved from each ORAM is equalized.

* * * * *